(12) United States Patent
Xiong et al.

(10) Patent No.: US 11,620,349 B1
(45) Date of Patent: Apr. 4, 2023

(54) TOP FAN IDENTIFICATION BASED ON CONTENT ENGAGEMENT

(71) Applicant: Meta Platforms, Inc., Menlo Park, CA (US)

(72) Inventors: Hongzheng Xiong, Newark, CA (US); Ashish Gupta, Mountain View, CA (US); Vamsi Krishna Cheekatimalla, Sunnyvale, CA (US); Siwei Dong, Redwood City, CA (US); Omer Shahid, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 275 days.

(21) Appl. No.: 16/830,094

(22) Filed: Mar. 25, 2020

(51) Int. Cl.
| | |
|---|---|
| *G06F 16/00* | (2019.01) |
| *G06F 16/9536* | (2019.01) |
| *G06N 20/00* | (2019.01) |
| *G06Q 50/00* | (2012.01) |
| *G06F 16/9535* | (2019.01) |
| *G06F 16/9538* | (2019.01) |

(52) U.S. Cl.
CPC ...... *G06F 16/9536* (2019.01); *G06F 16/9535* (2019.01); *G06F 16/9538* (2019.01); *G06N 20/00* (2019.01); *G06Q 50/01* (2013.01)

(58) Field of Classification Search
CPC ............ G06F 16/9536; G06F 16/9535; G06F 16/9538; G06N 20/00; G06Q 50/01
See application file for complete search history.

(56) References Cited

U.S. PATENT DOCUMENTS

| | | | |
|---|---|---|---|
| 9,384,258 B1* | 7/2016 | Lee-chan | G06F 3/0481 |
| 2016/0371737 A1* | 12/2016 | Lewis | G06Q 50/01 |
| 2019/0050731 A1* | 2/2019 | Lu | G06N 3/08 |
| 2020/0134637 A1* | 4/2020 | Srinivasan | G06Q 30/016 |

* cited by examiner

*Primary Examiner* — Hung Q Pham
(74) *Attorney, Agent, or Firm* — Sheppard Mullin Richter & Hampton LLP

(57) ABSTRACT

Systems, methods, and non-transitory computer-readable media can determine respective engagement scores for one or more users based at least in part on their engagement with a plurality of content items associated with an entity in a content provider system. At least one user who is a top fan of the entity can be determined based at least in part on the determined engagement scores. The user can be associated with a visual badge in the content provider system to identify the user as a top fan of the entity, wherein the visual badge is made visible by the content provider system to at least the entity.

20 Claims, 10 Drawing Sheets

TOP FAN IDENTIFICATION BASED ON CONTENT ENGAGEMENT

FIELD OF THE INVENTION

The present technology relates to the field of data filtering. More particularly, the present technology relates to techniques for distinguishing content based on page engagement information over a computerized networking system.

BACKGROUND

Today, people often utilize computing devices (or systems) for a wide variety of purposes. Users can use their computing devices to, for example, interact with one another, access content, share content, and create content. In some cases, content items can include posts from members of a social networking system. The posts may include text and media content items, such as images, videos, and audio. The posts may be published to the social networking system for consumption by others. Further, users can engage with posts, for example, by selecting options to react to a post (e.g., like, happy, sad, etc.), comment on the post, and share the post through the social networking system.

SUMMARY

Various embodiments of the present technology can include systems, methods, and non-transitory computer readable media configured to determine respective engagement scores for one or more users based at least in part on their engagement with a plurality of content items associated with an entity in a content provider system. At least one user who is a top fan of the entity can be determined based at least in part on the determined engagement scores. The user can be associated with a visual badge in the content provider system to identify the user as a top fan of the entity, wherein the visual badge is made visible by the content provider system to at least the entity.

In an embodiment, the systems, methods, and non-transitory computer readable media are configured to determine at least one comment posted by the user in response to a content item associated with the entity and rank the at least one comment higher than a comment posted by a different user based at least in part on the user being a top fan of the entity and the different user not being a top fan of the entity.

In an embodiment, the systems, methods, and non-transitory computer readable media are configured to determine that the at least one comment posted by the user satisfies a high quality comment metric.

In an embodiment, the systems, methods, and non-transitory computer readable media are configured to distribute additional content associated with the entity to the at least one user who is determined to be a top fan of the entity, wherein the additional content is different from content distributed to other users who are not top fans of the entity.

In an embodiment, the systems, methods, and non-transitory computer readable media are configured to enroll the at least one user who is determined to be a top fan of the entity as a member of a group in the content provider system, wherein membership in the group is restricted to users determined to be top fans of the entity.

In an embodiment, the systems, methods, and non-transitory computer readable media are configured to generate a leaderboard to highlight engagement activity by users determined to be top fans of the entity, the leaderboard including engagement activity by the at least one user who is determined to be a top fan of the entity.

In an embodiment, the systems, methods, and non-transitory computer readable media are configured to determine at least a first engagement sub-score based on engagement by the user with respect to a first content item associated with the entity; determine at least a second engagement sub-score based on engagement by the user with respect to a second content item associated with the entity; and determine the engagement score for the user based at least in part on the first and second engagement sub-scores.

In an embodiment, determining at least a first engagement sub-score further comprises determining types of engagement by the user with respect to the first content item associated with the entity; determining respective weights for the types of engagement by the user; and determining the first engagement sub-score based at least in part on the types of engagement by the user and the respective weights determined for the types of engagement.

In an embodiment, the types of engagement by the user include one or more of an indication of whether the user selected a like reaction in response to the content item associated with the entity, an indication of whether the user selected a love reaction in response to the content item associated with the entity, an indication of whether the user selected a funny reaction in response to the content item associated with the entity, an indication of whether the user selected a shock reaction in response to the content item associated with the entity, an indication of whether the user selected a sad reaction in response to the content item associated with the entity, an indication of whether the user selected an angry reaction in response to the content item associated with the entity, a count of high quality comments submitted by the user in response to the content item associated with the entity, a count of low quality comments submitted by the user in response to the content item associated with the entity, a count of instances the user shared the content item associated with the entity, an indication of whether the user selected a respond option associated with the content item of the entity, and an indication of whether the user selected a dislike reaction in response to the content item associated with the entity.

In an embodiment, the respective weights for the types of engagement are learned based at least in part on a machine learning regression model that relates user responses to content satisfaction surveys and user engagement with content items associated with the content satisfaction surveys.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

Figure 1:
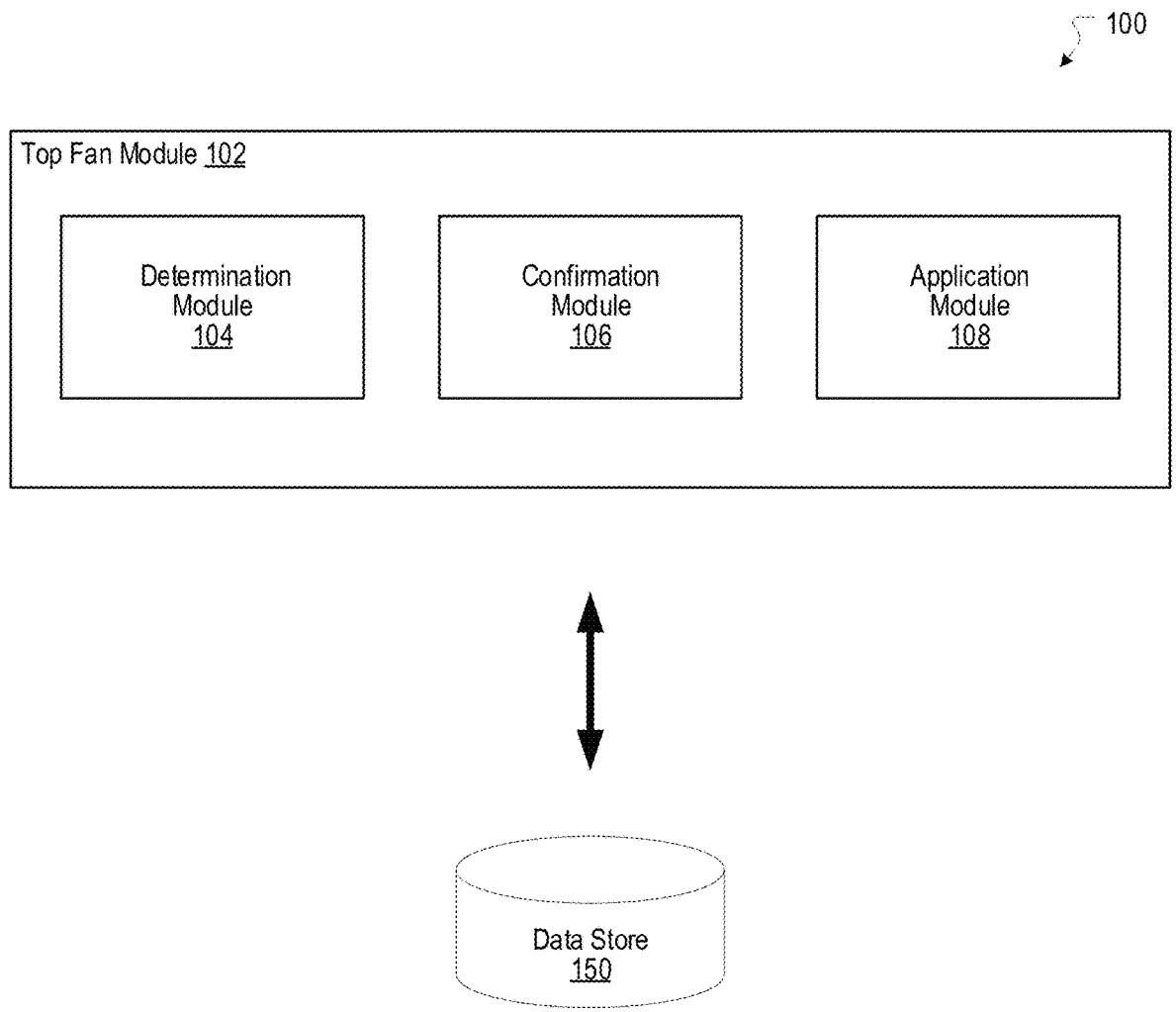
FIG. 1 illustrates an example system including an example top fan module, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Filtering Content Based on Entity Engagement Information

People often utilize computing devices (or systems) for a wide variety of purposes. Users can use their computing devices to, for example, interact with one another, access content, share content, and create content. In some cases, content items can include posts from members of a content provider system, such as a social networking system. The posts may include text and media content items, such as images, videos, and audio. The posts may be published to the social networking system for consumption by others. Further, users can engage with posts, for example, by selecting options to react to a post (e.g., like, happy, sad, etc.), comment on the post, and share the post through the social networking system.

Under conventional approaches, users (or entities) of the content provider system can follow other users. When a first user follows a second user, a content feed associated with the first user can be populated with content items associated with the second user. An entity can generally see which other users are following the entity. The entity, which can be represented as a page in the content provider system, can also engage with the followers, for example, by replying to comments posted by the followers through the content provider system. In some instances, an entity may have millions of followers, for example, due to the entity's status as a public figure. In such instances, the entity typically has to selectively engage with the entity's followers since it can be practically impossible for the entity to individually engage with all of the entity's millions of followers. As a result, determinations by the entity about which followers to engage can be time consuming, arbitrary, incomplete, and unreliable. For example, the entity may resort to reading comments posted by a follower to determine whether to respond to the comments. However, given the entity's millions of followers, this approach can result in the entity unintentionally overlooking or missing comments from followers that are genuine fans of the entity as opposed to other types of followers, such as followers that may engage with the entity for some nefarious or otherwise inappropriate purpose (e.g., cyberbullying). Thus, in order to facilitate constructive engagement by the entity, there exists a need to address the problems relating to reliably determining which followers of the entity are top fans of the entity and distinguishing these top fans from other followers. Conventional approaches are not effective in addressing these and other problems arising in computer technology.

An improved approach rooted in computer technology overcomes the foregoing and other disadvantages associated with conventional approaches specifically arising in the realm of computer technology. In various embodiments, users following a given entity (followers) can be evaluated to identify top fans of the entity. The entity can be represented as a page in a content provider system or a social networking system. For example, the users can be evaluated based on their interactions (or engagement) with content items associated with the entity, or a page associated with the entity, over some period of time (e.g., 30 days, 60 days, etc.). In various embodiments, a follower that is determined to engage positively with the entity based on satisfaction of a threshold engagement score can be identified as a top fan of the entity. Such positive engagement can be determined based on the follower's reactions to content items associated with the entity (e.g., like, happy, sad, angry, etc.), comments posted by the follower in response to content items associated with the entity, a number of times the follower shared (or re-shared) content items associated with the entity, and an amount of time the follower viewed content items associated with the entity (e.g., watch time), to name some examples. In various embodiments, users identified as top fans of the entity can be distinguished from other users. For example, in some embodiments, top fans can be associated with a visual badge that signifies their status as top fans of the entity. The visual badge can be made visible to the entity, thereby providing a helpful visual indication to the entity that a given follower is a top fan of the entity. This visual indication can help promote entity engagement with users that are top fans of the entity while reducing instances where the entity engages with less deserving users, such as users that seek to cyberbully or otherwise inappropriately engage with the entity. Further, in some embodiments, content posted by users who are top fans of the entity can be ranked differently than content posted by users who are not top fans of the entity. For example, comments posted by top fans of the entity can be ranked higher than comments posted by users who are not top fans of the entity, thereby increasing their likelihood of being seen and being engaged by the entity. Many variations are possible. More details relating to the present technology are provided below.

FIG. 1 illustrates an example system 100 including an example top fan module 102, according to an embodiment of the present technology. As shown in the example of FIG. 1, the top fan module 102 can include a determination module 104, a confirmation module 106, and an application module 108. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details. The top fan module 102 can be implemented in or by any suitable system through which content is accessible, such as a content provider system or social networking system. Although a content provider system or a social networking system is sometimes referenced herein for purposes of illustration, the present technology can be implemented in or by other types of systems.

In some embodiments, the top fan module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the top fan module 102 or at least a portion thereof can be implemented using one or more computing devices or systems that include one or more servers, such as network servers or cloud servers. In some instances, the top fan module 102 can, in part or in whole, be implemented within or configured to operate in conjunction with a social networking system (or service), such as a social networking system 630 of FIG. 6. In some instances, the top fan module 102 can be, in part or in whole, implemented within or configured to operate in conjunction or be integrated with a client computing device, such as a user device 610 of FIG. 6. For example, the top fan module 102 can be implemented as or within a dedicated application (e.g., app), a program, or an applet running on a user computing device or client computing system. The application incorporating or implementing instructions for performing some, or all, functionality of the top fan module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases but can be the same entity in other cases.

The top fan module 102 can be configured to communicate and/or operate with the data store 150, as shown in the example system 100. The data store 150 can be configured to store and maintain various types of data. For example, the data store 150 can store information describing various content that has been posted (or shared) by users of a social networking system. In some implementations, the data store 150 can store information associated with the social networking system (e.g., the social networking system 630 of FIG. 6). The information associated with the social networking system can include data about users, user responses to surveys and associated engagement data, social connections, social interactions, locations, geo-fenced areas, maps, places, events, pages, groups, posts, communications, content, feeds, account settings, privacy settings, a social graph, and various other types of data. In some implementations, the data store 150 can store information associated with users, such as user identifiers, user information, profile information, user specified settings, visual content such as images and video produced or posted by users, audio content such as digital copies of musical and other audio-based recordings, and various other types of user data.

The determination module 104 can be configured to identify one or more users of a content provider system (e.g., social networking system) who are top fans of a given entity or a page associated with the entity on the content provider system. For example, a page associated with an entity can be a virtual location on the content provider system that represents or is dedicated to the entity. The page can contain, for example, content associated with the entity. In some embodiments, a user can be identified as a top fan of an entity based on information describing the user's engagement with the entity or a page of the entity through the content provider system. For example, users that positively engage with the entity through the content provider system can be identified as top fans of the entity. In some embodiments, user engagement with an entity, or content associated with the entity, can be deemed positive or negative based on an engagement score. More details regarding the determination module 104 will be provided below with reference to FIG. 2.

The confirmation module 106 can be configured to provide users with information regarding top fan recognition attributed to the users. For example, in various embodiments, once a user has been determined to be a top fan of a given entity, the confirmation module 106 can notify the user of this distinction through the content provider system. For example, the confirmation module 106 may provide the user with one or more notifications (e.g., messages, communications, pop-ups, etc.) that indicate the user has been identified as a top fan of the entity. In some embodiments, the notifications can include an option to accept (or reject) being recognized as a top fan of the entity. In such embodiments, the user can respond to a notification by selecting the option to accept (or reject) being recognized as a top fan of the entity. In some embodiments, various operations can be performed in relation to the user when the user is associated with the top fan recognition, as described below in reference to the application module 108.

In some embodiments, the confirmation module 106 can apply a notification machine learning model to optimize notification efficiency. For example, the notification machine learning model can be trained based on responses from users accepting or rejecting their recognition as a top fan of an entity. The notification machine learning model can learn to predict a likelihood of a given user accepting their recognition as a top fan of an entity based on user features associated with the user. In such embodiments, when a given user is preliminarily identified as a top fan of some entity by, for example, the determination module 104, the confirmation module 106 can provide the notification machine learning model with user features associated with the user (e.g., interests, demographics, entities followed, engagement history, etc.) to obtain a likelihood of the user accepting the top fan recognition. In some embodiments, if the likelihood satisfies a threshold value, then the confirmation module 106 can provide user with one or more notifications indicating the user has been identified as a top fan of the entity and request confirmation, as described above. Otherwise, in some embodiments, if the likelihood does not satisfy the threshold value, the confirmation module 106 will not provide notifications to the user despite the user preliminarily being identified as a top fan by the determination module 104.

The application module 108 can be configured to perform various operations when a user has been confirmed as a top fan of a given entity. For example, in some embodiments, the application module 108 can associate a visual badge with the user (e.g., "Top Fan" badge) that recognizes the user as a top fan of the entity. In some embodiments, the visual badge can be visible to both the user and the entity. Such visibility can provide the entity with a visual indication that signifies the user is a top fan who has historically engaged with the entity in a positive manner. As a result, the entity is able to more easily, efficiently, and reliably determine which users to engage and which users to avoid. In some embodiments, the visual badge may be visible to other users of the content provider system when the user engages with the entity. For example, the visual badge may be shown when the user posts a comment in response to content associated with the entity. In some embodiments, the visual badge can be shown in a user profile associated with the user. Many variations are possible.

In some embodiments, the application module 108 can rank content posted by top fans of a given entity differently than other users. For example, the application module 108 can re-rank comments that were posted by a top fan of an entity in response to a content item associated with the entity. For example, in some embodiments, a comment posted by the top fan can be ranked higher than other comments posted by other users who are not top fans when the comment posted by the top fan satisfies a high quality metric or threshold. In some instances, such a comment can be displayed before or more prominently than the other comments. In some embodiments, a comment posted by the top fan can be ranked lower than other high quality comments posted by other users who are not top fans when the comment posted by the top fan satisfies a low quality metric or threshold. In some instances, such a comment can be displayed after or less prominently than the other comments. In various embodiments, the application module 108 can apply a comment quality machine learning model to determine comment quality. In such embodiments, the comment quality machine learning model can be trained based on user responses to comment quality surveys. For example, a user can be provided a survey that asks the user to rate a comment as being high quality or low quality based on some numeric scale. In this example, the user's response to the survey, along with other features associated with a comment, can be used to train the comment quality machine learning model. Once trained, the comment quality machine learning model can learn to predict a likelihood of a given comment being high quality or low quality based on the features associated with the comment. These features can include, for example, a sentiment determined for the comment (e.g., positive or negative sentiment), text attributes (e.g., offensive language, incorrect grammar, misspellings, comment length, etc.), user engagement, and the like. Many variations are possible.

In some embodiments, the application module 108 can distribute content differently to top fans. For example, in some embodiments, the application module 108 can distribute additional (or all) content posted by (or otherwise associated with) an entity to users who are top fans of the entity. In contrast, users who are not top fans but rather followers of the entity may selectively be provided content posted by the entity. In some instances, such content can be distributed to top fans and users who are not top fans through their respective content feeds in the content provider system.

In some embodiments, the application module 108 can create a new group in the content provider system for top fans of an entity. In such embodiments, membership in the group can be restricted to the top fans of the entity. The group can provide various opportunities for the top fans to interact, such as posting content to the group and exchanging messages with other top fans of the entity through the content provider system. In some embodiments, one or more users that are top fans can be assigned to moderate the group.

In some embodiments, the application module 108 can create a leaderboard to highlight activity by top fans of an entity. For example, the leaderboard can indicate top fan posts and engagement in relation to the entity. In some embodiments, the leaderboard can rank top fans of the entity based on engagement scores associated with the top fans, as discussed in more detail below. In such embodiments, the leaderboard provides information that allows the entity to easily discern between top fans that seek to positively engage with the entity versus users that may follow the entity for some nefarious or otherwise inappropriate purpose (e.g., cyberbullying).

Figure 2:
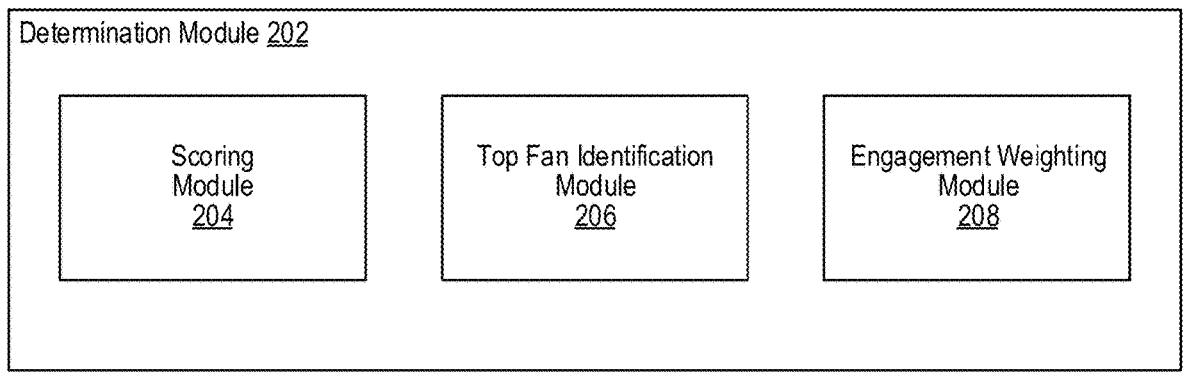
FIG. 2 illustrates an example determination module, according to an embodiment of the present technology.

FIG. 2 illustrates a determination module 202, according to an embodiment of the present technology. The determination module 202 can identify users of the content provider system who are top fans of a given entity. In some embodiments, the determination module 104 of FIG. 1 can be implemented with the determination module 202. As shown in the example of FIG. 2, the determination module 202 can include a scoring module 204, a top fan identification module 206, and an engagement weighting module 208.

The scoring module 204 can determine respective engagement scores for users with respect to a given entity. In some embodiments, the engagement scores can be used to determine which users are top fans of the entity. In some embodiments, the engagement scores can be used to rank top fans of the entity. In some embodiments, an engagement score for a user with respect to the entity can be determined based on a sum of engagement sub-scores. Each engagement sub-score can be determined based on the user's engagement with a content item associated with the entity during some period of time (e.g., 30 days, 60 days, 90 days, etc.). One example equation for determining an engagement score for a user-entity pair is as follows:

$$\Sigma(es_1 + es_2 + \ldots + es_n),$$

where $es_1$ is a first engagement sub-score determined based on the user's engagement with a first content item associated with the entity during some period of time, where $es_2$ is a second engagement sub-score determined based on the user's engagement with a second content item associated with the entity during the period of time, and where $es_n$ is an nth engagement sub-score determined based on the user's engagement with an nth content item associated with the entity during the period of time.

One example equation for determining an engagement sub-score based on the user's engagement with a content item associated with the entity is as follows:

$$es = (e_1 * w_1) + (e_2 * w_2) \ldots + (e_n * w_n),$$

where $e_1$ is a first variable that corresponds to a value (or count) associated with a first type of user engagement by the user with respect to the content item (e.g., a like reaction) and $w_1$ corresponds to a weight to be applied to the first type of user engagement, where $e_2$ corresponds to a value (or count) associated with a second type of user engagement by the user with respect to the content item (e.g., a love reaction) and $w_2$ corresponds to a weight to be applied to the second type of user engagement, and where $e_n$ corresponds to a value (or count) associated with an $n^{th}$ type of user engagement by the user with respect to the content item and $w_n$ corresponds to a weight to be applied to the $n^{th}$ type of user engagement. The various weights applied to the various types of user engagement are discussed in more detail below. In various embodiments, the example equation for determining an engagement sub-score can additionally (or alternatively) evaluate or be based on myriad variables corresponding to different types of user engagements. For example, in some embodiments, the equation can evaluate a first variable corresponding to whether a user selected a like reaction in response to a content item associated with an entity, a second variable corresponding to whether the user selected a love reaction in response to the content item associated with the entity, a third variable corresponding to whether the user selected a funny reaction in response to the content item associated with the entity, a fourth variable corresponding to whether the user selected a shock reaction in response to the content item associated with the entity, a fifth variable corresponding to whether the user selected a sad reaction in response to the content item associated with the entity, and a sixth variable corresponding to whether the user selected an angry reaction in response to the content item associated with the entity. In some embodiments, the equation can also evaluate a variable corresponding to a count of high quality comments submitted by the user in response to the content item associated with the entity and a variable corresponding to a count of low quality comments submitted by the user in response to the content item associated with the entity. In some embodiments, the equation can evaluate a variable corresponding to a count of instances the user shared the content item associated with the entity. In some embodiments, the equation can evaluate a variable corresponding to whether the user selected a respond option (e.g., rsvp) associated with the content item of the entity. In some embodiments, the equation can evaluate a variable corresponding to whether the user selected a dislike reaction in response to the content item associated with the entity. Many variations are possible.

Additional variables representing different types of user engagement can be included in the equation for determining an engagement sub-score. For example, in some embodiments, the equation can evaluate or be based on a variable corresponding to an amount of time the content item associated with the entity was presented within a viewport of a computing device associated with the user. In some embodiments, the equation can evaluate a variable corresponding to an amount of time the content item associated with the entity was presented within a webview generated by a computing device associated with the user. In some embodiments, the equation can evaluate a variable corresponding to a count of outbound clicks by the user on links included with the content item associated with the entity. In some embodiments, the equation can evaluate a variable corresponding to whether the user viewed the content item associated with the entity for at least a predefined amount time (e.g., 30 seconds). In some embodiments, the equation can evaluate a variable corresponding to a count of clicks by the user on media (e.g., images, video, etc.) in or associated with the content item associated with the entity. Many variations are possible. The variables provided above are examples and, depending on the implementation, the equation for determining an engagement sub-score for a content item may include some of the variables, all of the variables, or additional variables.

The top fan identification module 206 can identify users who are top fans of a given entity based on engagement scores determined for the users with respect to the entity by the scoring module 204. For example, in some embodiments, the top fan identification module 206 identifies all users associated with an engagement score that satisfies a threshold value as top fans of the entity. In some embodiments, the top fan identification module 206 identifies a predefined number of users (e.g., top 10, top 100, top 1,000, etc.) associated with an engagement score that satisfies a threshold value as top fans of the entity. In some embodiments, the top fan identification module 206 can rank followers of an entity based on their engagement scores and select a threshold number of highest ranking followers as top fans of the entity. Many variations are possible.

Figure 3A:
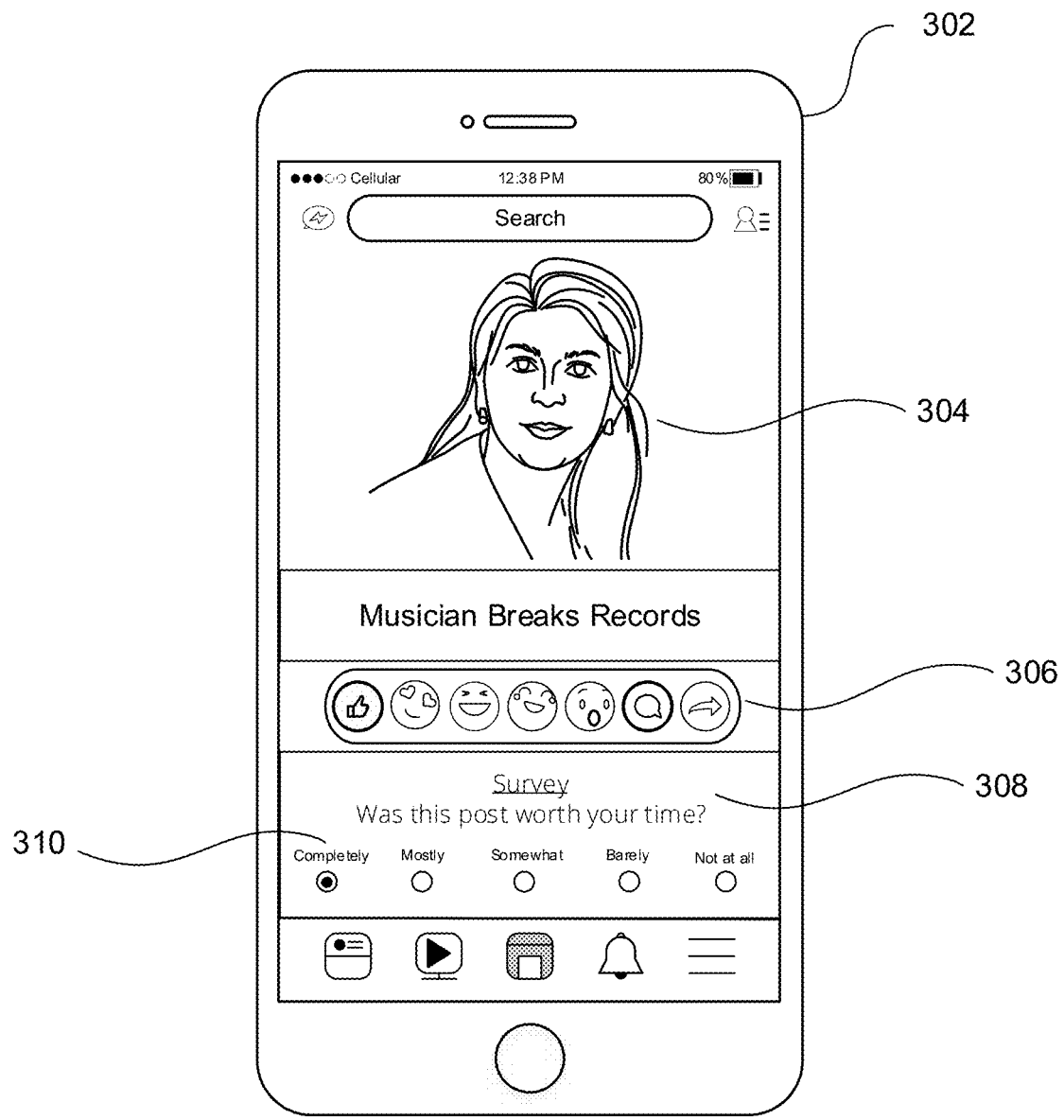
FIG. 3A-3C illustrate example diagrams, according to an embodiment of the present technology.

The engagement weighting module 208 can be configured to learn weights for different types of user engagements based on a machine learning model, such as a machine learning regression model. As discussed above, the example equation for determining an engagement sub-score can include weighted variables $w_n$ for different types of user engagements. For example, weights can be applied to emphasize user engagements that are associated with positive interactions and deemphasize user engagements that are associated with negative interactions. As an example, a high quality comment submitted by a user in response to a content item associated with an entity can be weighted more heavily than a low quality comment to emphasize the high quality comment as a positive interaction and to deemphasize the low quality comment as a negative interaction. In another example, a love reaction can be weighted more heavily than a dislike reaction because the love reaction is more associated with a positive interaction than the dislike reaction. To learn weights for the different types of user engagements, the engagement weighting module 208 can provide content items associated with different entities along with content satisfaction surveys to a sampling of users. A content satisfaction survey provided with a content item can ask a user to indicate whether the user found the content item to be worthwhile. For example, FIG. 3A illustrates an example content item 304 associated with an entity being presented on a display screen of a computing device 302 of a user. In this example, the content item 304 can be provided with options 306 for engaging with the content item 304 and a content satisfaction survey 308. The options 306 for engaging with the content item 304 can correspond to the various types of user engagement discussed above. The options 306 for engaging with the content item 304 can include, for example, reaction options (e.g., like, love, happy, angry, etc.), an option to post a comment in response to the content item 304, and an option to share the content item 304 with other users, to name some examples. The content satisfaction survey 308 can include feedback options 310 the user can select to respond. For example, the options can include a first option to indicate the user was "completely" satisfied, a second option to indicate the user was "mostly" satisfied, a third option to indicate the user was "somewhat" satisfied, a fourth option to indicate the user was "barely" satisfied, and a fifth option to indicate the user was "not at all" satisfied. These options are provided as examples and, naturally, other options may be provided. In the example of FIG. 3A, the user selected a like reaction and submitted two high quality comments in response to the content item 304. The user also selected the first option in the survey 308 to indicate the user was "completely" satisfied with the content item 304.

Figure 3B:
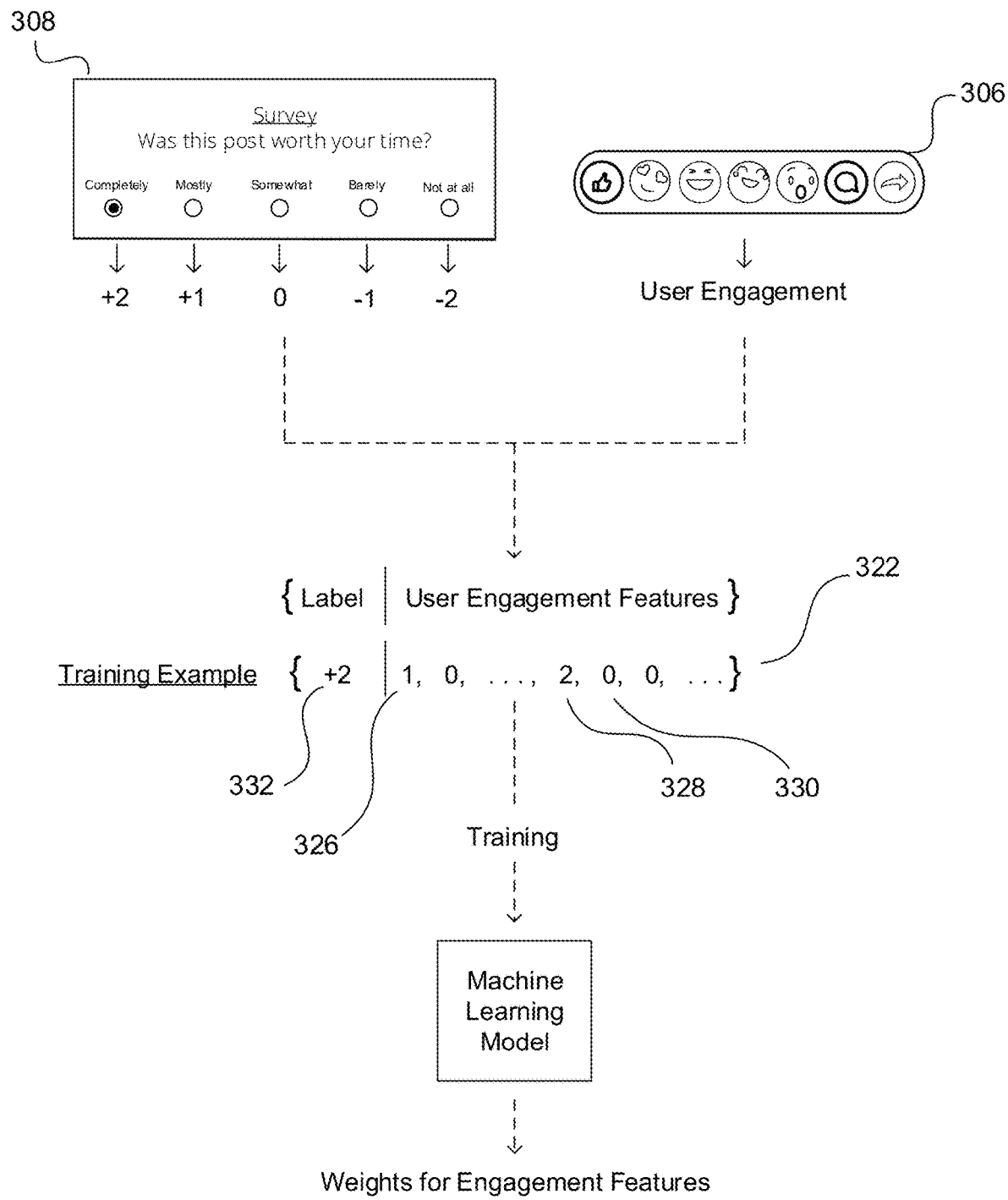

The engagement weighting module 208 can generate examples for training the machine learning regression model based on user engagement with content items associated with entities and their responses to content satisfaction surveys associated with those content items. For example, FIG. 3B illustrates an example generation of a training example 322 based on the options 306 selected by the user to engage with the content item 304 and the feedback option 310 selected by the user in response to the survey 308. The training example 322 can be a vector including a set of features and a corresponding label. In various embodiments, the set of features can include numerical values to represent various types of user engagements including, for example, whether a user selected a like reaction in response to a content item associated with an entity, whether the user selected a love reaction in response to the content item associated with the entity, whether the user selected a funny reaction in response to the content item associated with the entity, whether the user selected a shock reaction in response to the content item associated with the entity, whether the user selected a sad reaction in response to the content item associated with the entity, whether the user selected an angry reaction in response to the content item associated with the entity, a count of high quality comments submitted by the user in response to the content item associated with the entity, a count of low quality comments submitted by the user in response to the content item associated with the entity, a count of instances the user shared the content item associated with the entity, whether the user selected a respond option (e.g., rsvp) associated with the content item of the entity, whether the user selected a dislike reaction in response to the content item associated with the entity, an amount of time the content item associated with the entity was presented within a viewport associated with the user, an amount of time the content item associated with the entity was presented within a webview associated with the user, a count of outbound clicks by the user on links included with the content item associated with the entity, a count of instances the user viewed the content item associated with the entity for at least a predefined amount time (e.g., 30 seconds), and a count of clicks by the user on media (e.g., images, video, etc.) included with the content item associated with the entity. These features are provided as examples and, depending on the implementation, the set of features may include some of these features, all of these features, or additional features.

For example, in FIG. 3B, the set of features includes options 306 selected by the user to engage with the content item 304 including at least a first feature 326 indicating the user selected a like reaction and a second feature 328 indicating the user submitted two high quality comments. A label 332 associated with the training example 322 can be also be represented numerically based on the selected feedback option 310. For example, in some embodiments, each option in the content satisfaction survey 308 can be assigned a numerical value. For example, the first option to indicate the user was "completely" satisfied can be associated with a numerical value of +2, the second option to indicate the user was "mostly" satisfied can be associated with a numerical value of +1, the third option to indicate the user was "somewhat" satisfied can be associated with a numerical value of 0, the fourth option to indicate the user was "barely" satisfied can be associated with a numerical value of -1, and the fifth option to indicate the user was "not at all" satisfied can be associated with a numerical value of -2. In FIG. 3B, the label 332 associated with the training example 322 has a numerical value of +2 based on the user's response to the survey 308. Once generated, the training example 322, along with other training examples, can be applied to train the machine learning regression model. The machine learning regression model can learn relationships between user responses to content satisfaction surveys that are provided with content items associated with entities and user engagement options selected for those content items. Based on these learned relationships, the machine learning regression model can determine respective weights for each feature in the set of features. The set of features can be weighted so that engagement options that more closely correlate with user satisfaction with content items (e.g., "completely" or "mostly" satisfied) are weighted more than engagement options that more closely correlate with user dissatisfaction with content items (e.g., "barely" or "not at all" satisfied). In various embodiments, the weights learned by the machine learning regression model can be applied when determining engagement sub-scores, as described above.

Figure 3C:
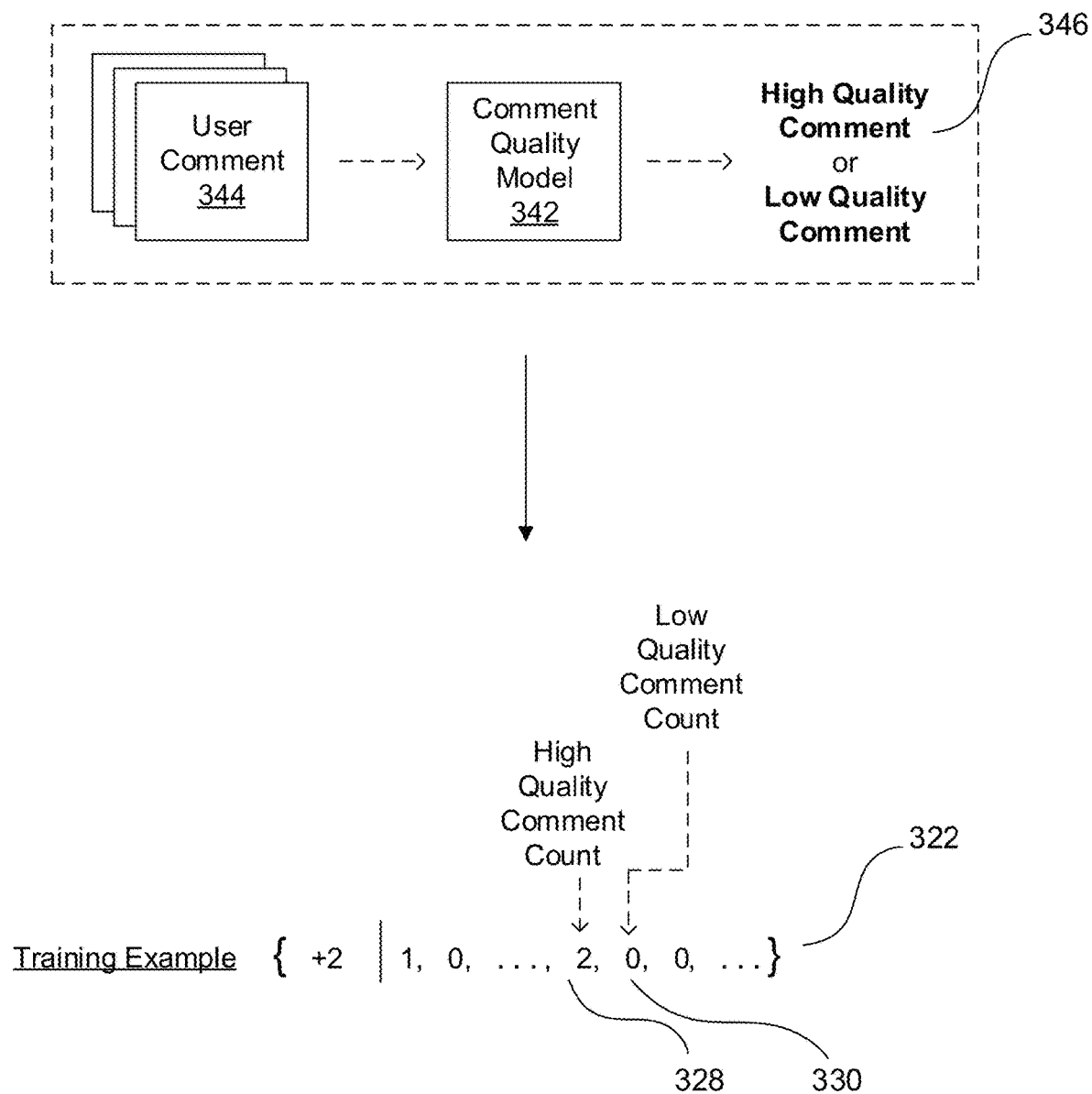

In various embodiments, a comment quality machine learning model 342 can be applied to determine comment quality as illustrated in FIG. 3C. For example, the model 342 can receive comments 344 posted by the user as input and can output 346 a likelihood of a given comment being high quality or low quality based on features associated with the comment. In some embodiments, the training example 322 can include a feature 328 that corresponds to a count of high quality comments posted by the user and a feature 330 that corresponds to a count of low quality comments posted by the user. The comment quality machine learning model can be trained based on user responses to comment quality surveys. For example, a user can be provided a survey that asks the user to rate a comment as being high quality or low quality based on some numeric scale. In this example, the user's response to the survey, along with other features associated with a comment, can be used to train the comment quality machine learning model. Once trained, the comment quality machine learning model can learn to predict a likelihood of a given comment being high quality or low quality based on the features associated with the comment. These features can include, for example, a sentiment determined for the comment (e.g., positive or negative sentiment), text attributes (e.g., offensive language, incorrect grammar, misspellings, comment length, etc.), user engagement, and the like.

Figure 4A:
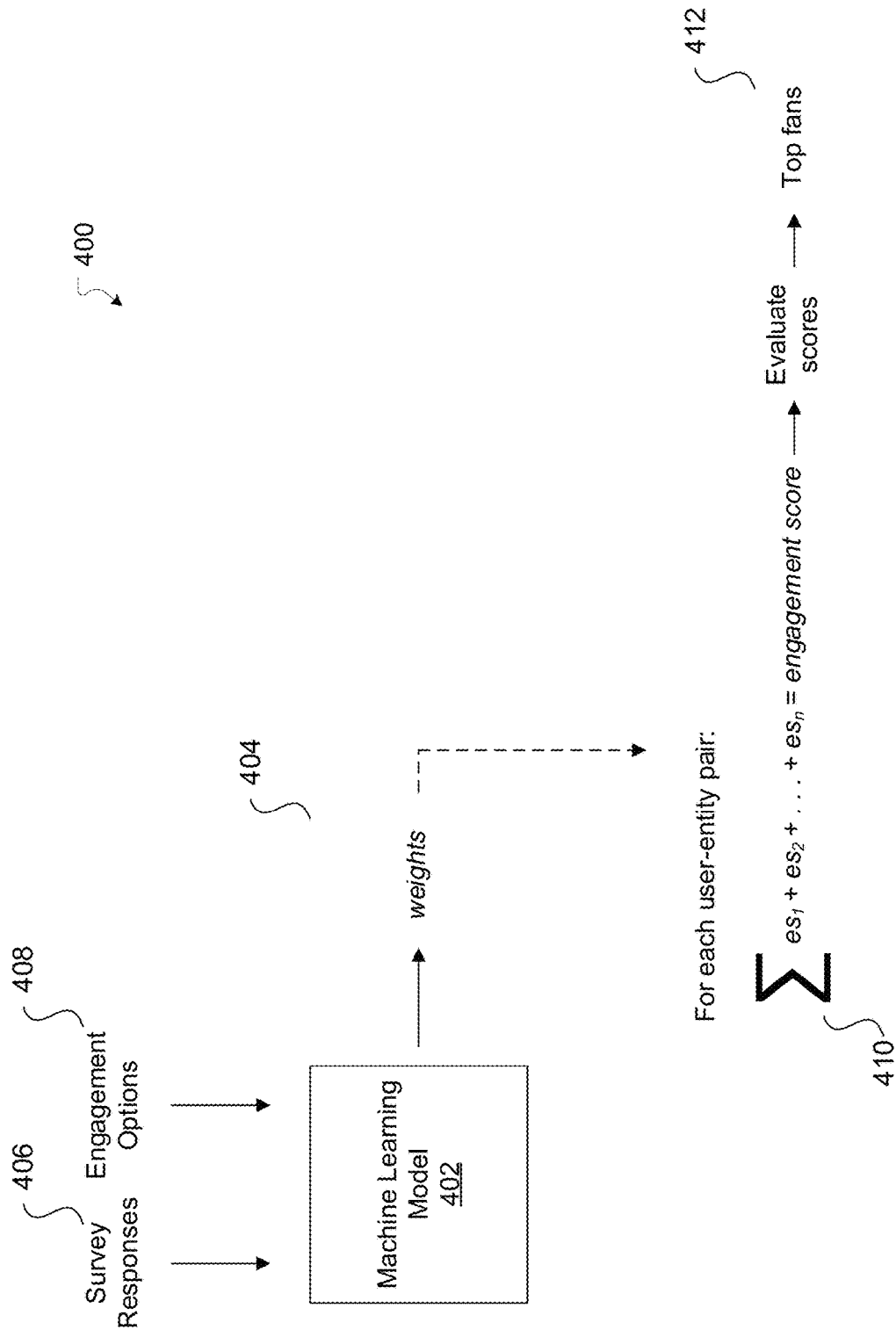
FIGS. 4A-4B illustrates example diagrams, according to an embodiment of the present technology.

FIG. 4A illustrates an example diagram 400 for determining users that are top fans of a given entity, according to an embodiment of the present technology. The example diagram 400 illustrates a machine learning model 402 that determines weights 404 for user engagement options (or types of user engagement). The machine learning model 402 can learn the weights 404 based on user responses 406 to content satisfaction surveys provided with content items associated with entities and engagement options 408 selected by the users in response to the content items, as described above. The learned weights 404 can be applied to determine an engagement score 410 for each user with respect to the given entity, as described above. The engagement scores associated with the users can be evaluated to identify one or more top fans 412 of the entity. For example, users associated with engagement scores that satisfy a threshold score can be identified as top fans of the entity. Many variations are possible.

Figure 4B:
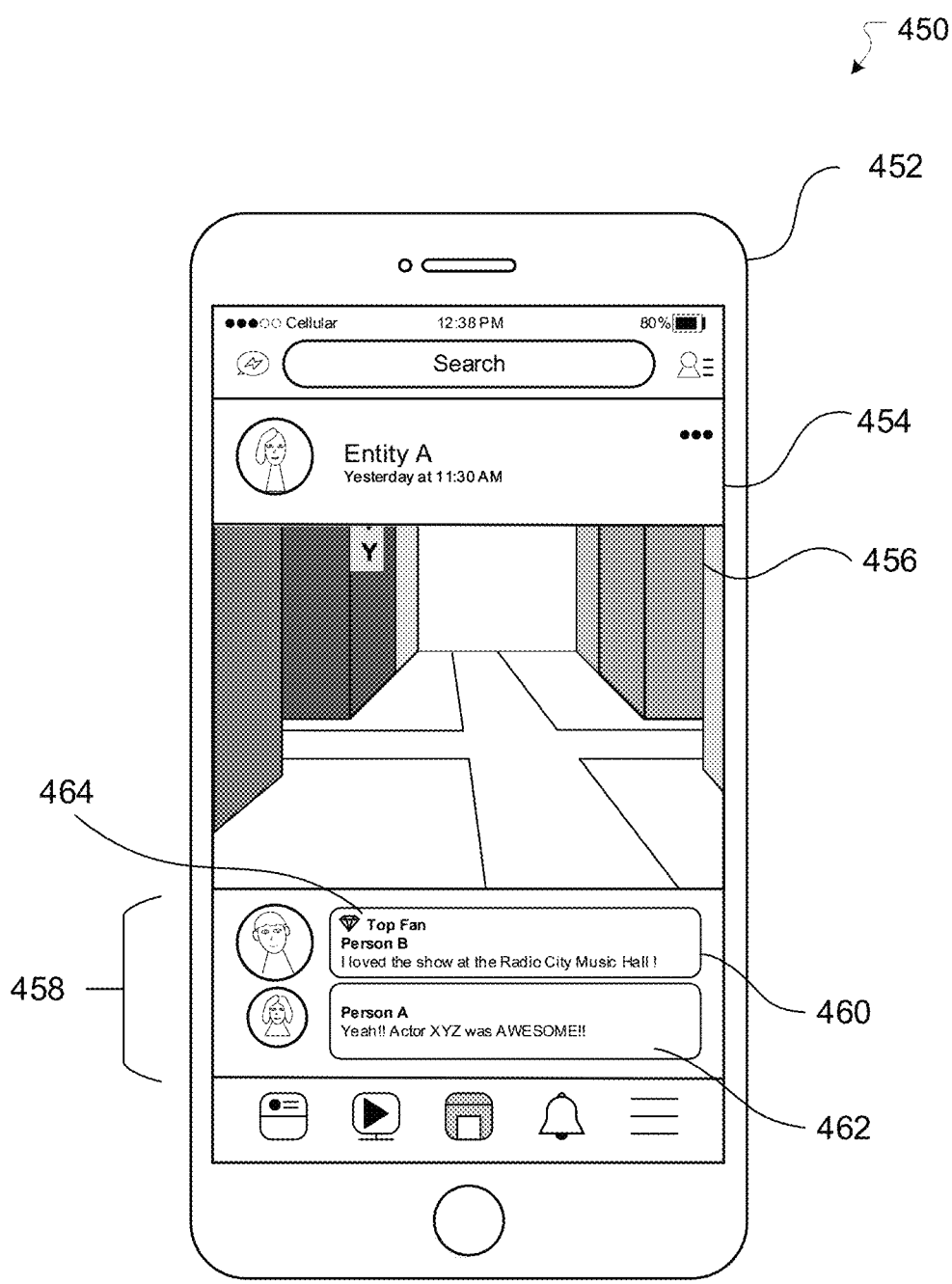

FIG. 4B illustrates an example 450 of an interface 454 that can be implemented by the top fan module 102, according to an embodiment of the present technology. In this example, the interface 454 is presented through a display screen of a computing device 452. Further, the interface 454 may be provided through an application (e.g., a web browser, a social networking application, messenger application, etc.) running on the computing device 452 that is configured to interact with the content provider system. In the example of FIG. 4B, the interface 454 is providing access to a content item 456 associated with an entity "Entity A". The interface 454 also shows a comments section 458 that provides access to comments submitted by users in response to the content item 456. In the example of FIG. 4B, the comments section 458 includes a first comment 460 that was submitted by a user determined to be a top fan of Entity A and a second comment 462 that was submitted by a user who is not a top fan of Entity A. In this example, the first comment 460 is ranked higher than the second comment 462 and presented before and more prominently than the second comment 462 because the first comment 460 was submitted by a top fan of Entity A. Further, a top fan badge 464 is shown alongside a name of the user who was determined to be a top fan to distinguish the user from other users who are not top fans of Entity A. Many variations are possible.

Figure 5:
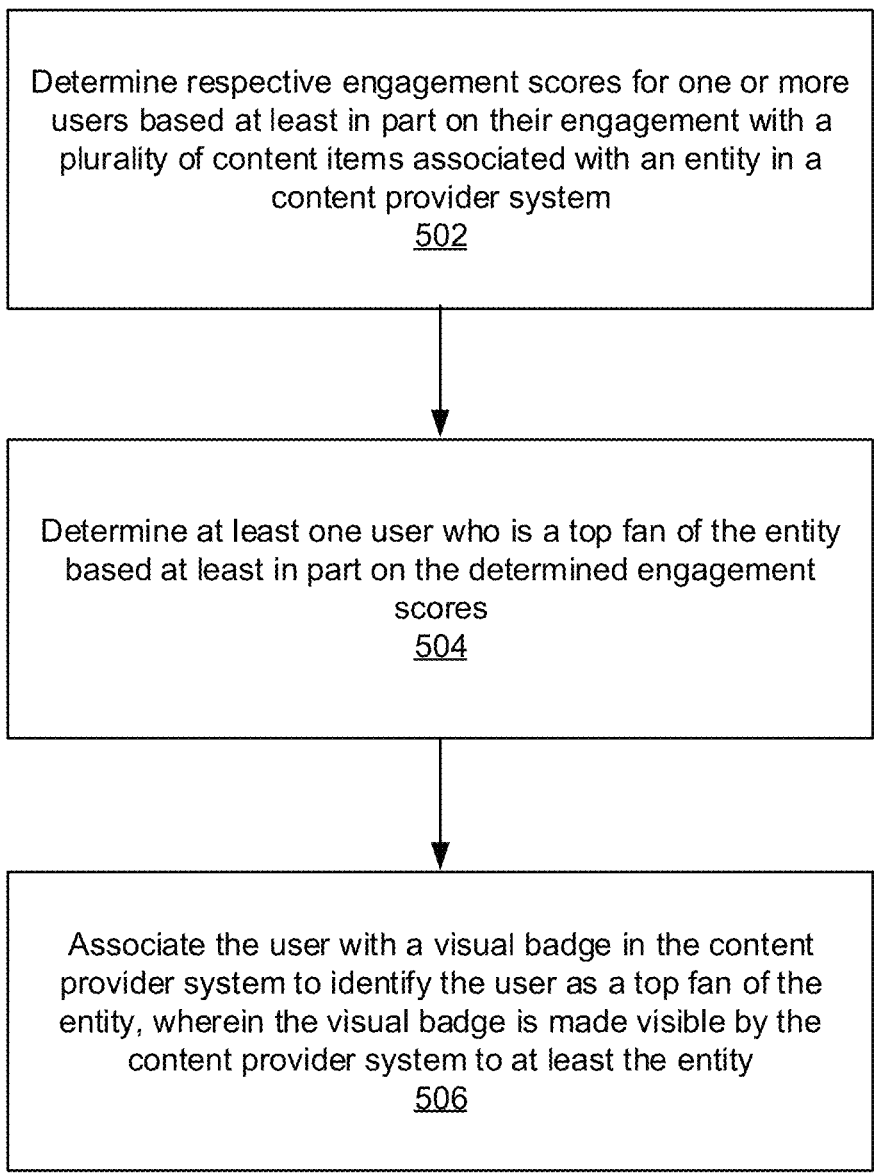
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, respective engagement scores for one or more users can be determined based at least in part on their engagement with a plurality of content items associated with an entity in a content provider system. At block 504, at least one user who is a top fan of the entity can be determined based at least in part on the determined engagement scores. At block 506, the user can be associated with a visual badge in the content provider system to identify the user as a top fan of the entity, wherein the visual badge is made visible by the content provider system to at least the entity.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
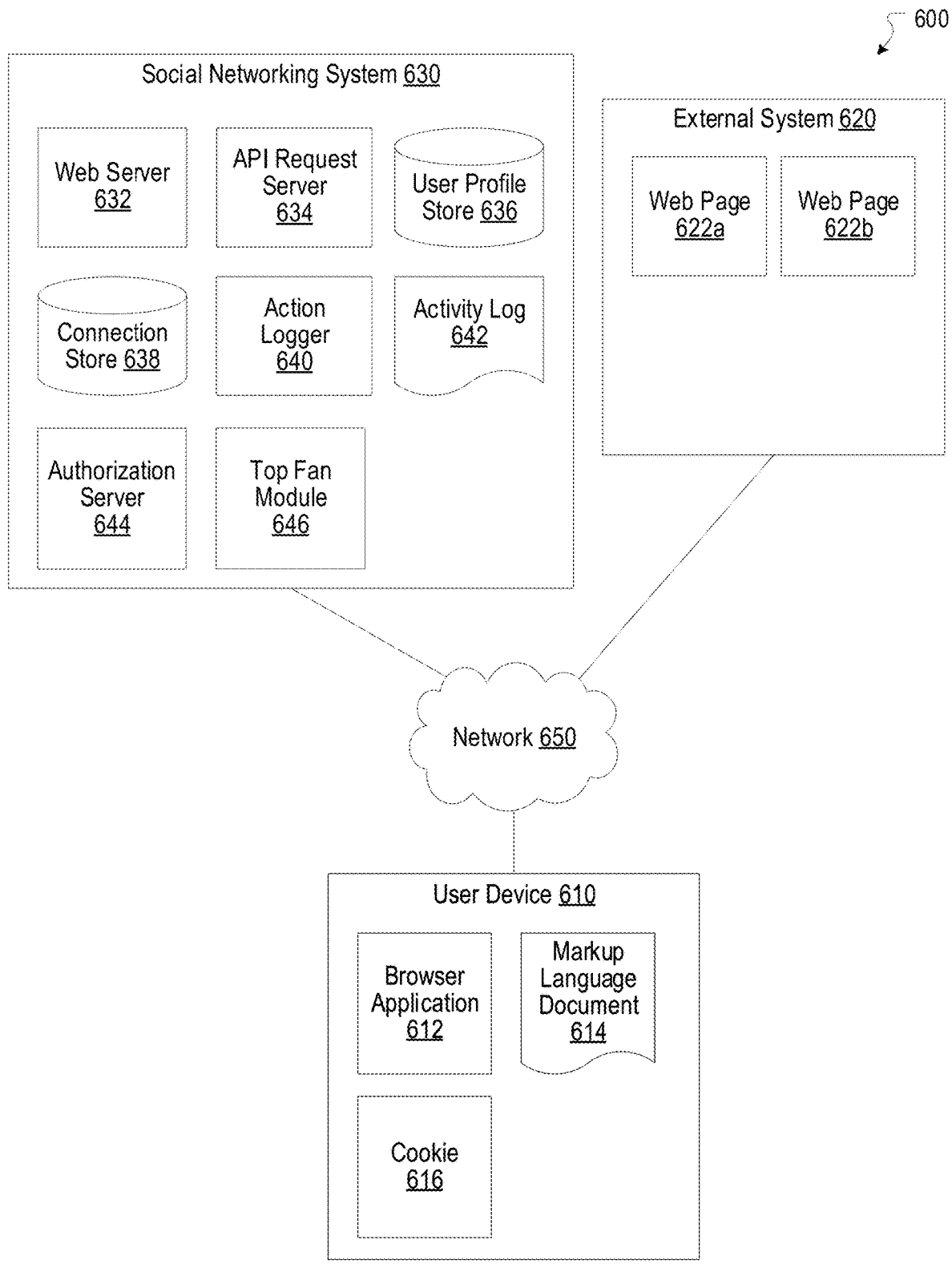
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a top fan module 646. The top fan module 646, for example, can be implemented as some or all of the functionality of the top fan module 102 of FIG. 1. In some embodiments, some or all of the functionality of the top fan module 102 of FIG. 1 can be provided in a top fan module implemented in the user device 610. As discussed previously, it should be appreciated that there can be many variations or other possibilities.

Hardware Implementation

Figure 7:
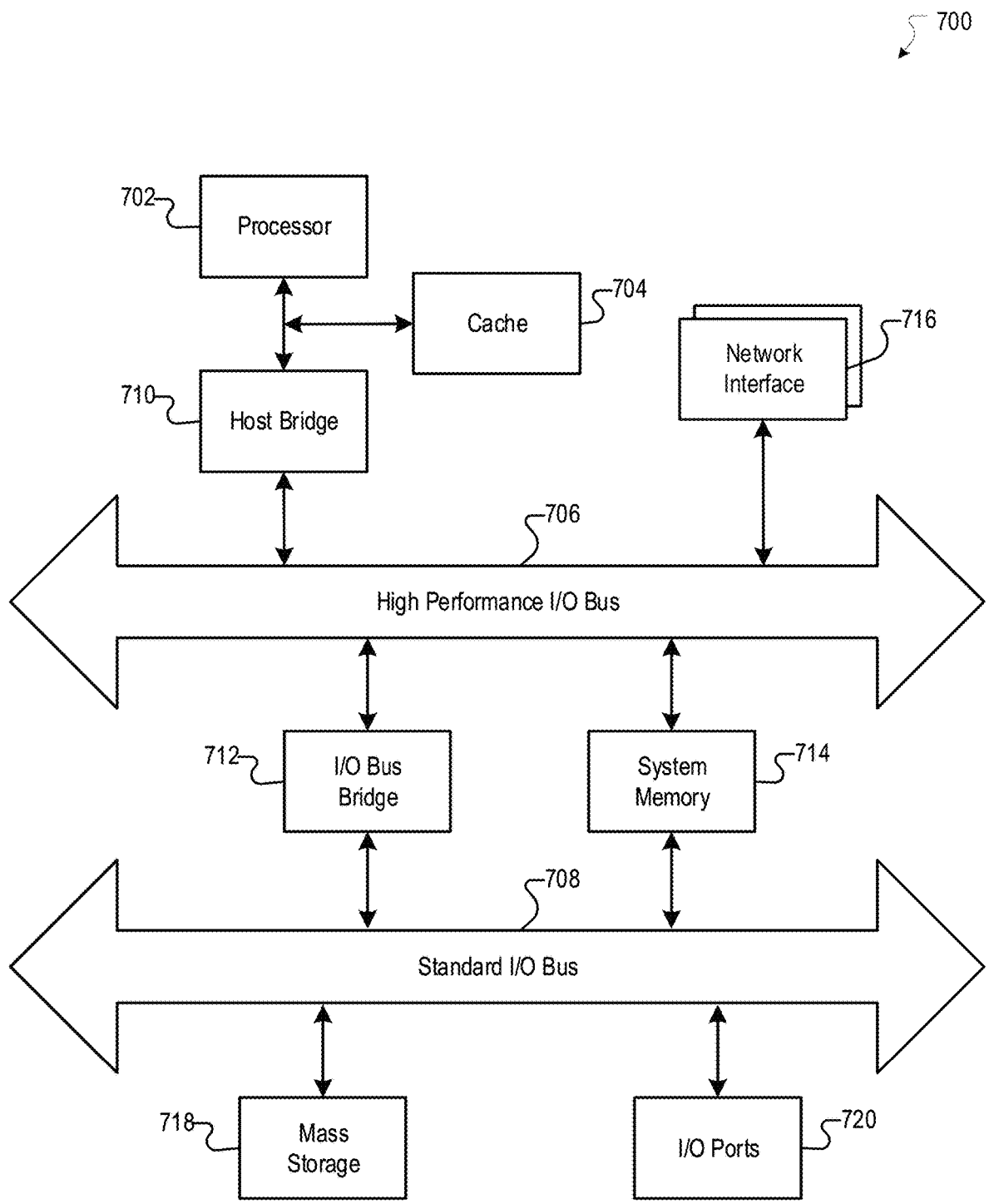
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, respective engagement scores for one or more users based at least in part on their engagement with a plurality of content items associated with an entity in a content provider system, wherein the engagement includes a type of engagement associated with high quality comments determined by a machine learning model that is trained based at least in part on user responses to comment quality surveys;
   determining, by the computing system, a user who is a top fan of the entity based at least in part on the engagement scores;
   providing, by the computing system, a notification to the user based on a likelihood that the user will accept recognition as a top fan; and
   based on acceptance of the recognition, associating, by the computing system, the user with a visual badge in the content provider system to identify the user as a top fan of the entity, wherein the visual badge is made visible by the content provider system to at least the entity.

2. The computer-implemented method of claim 1, further comprising:
   determining, by the computing system, at least one comment posted by the user in response to a content item associated with the entity; and
   ranking, by the computing system, the at least one comment higher than a comment posted by a different user based at least in part on the user being a top fan of the entity and the different user not being a top fan of the entity.

3. The computer-implemented method of claim 2, further comprising:
   determining, by the computing system, that the at least one comment posted by the user satisfies a high quality comment metric.

4. The computer-implemented method of claim 1, further comprising:
   distributing, by the computing system, additional content associated with the entity to the user who is determined to be a top fan of the entity, wherein the additional content is different from content distributed to other users who are not top fans of the entity.

5. The computer-implemented method of claim 1, further comprising:
   enrolling, by the computing system, the user who is determined to be a top fan of the entity as a member of a group in the content provider system, wherein membership in the group is restricted to users determined to be top fans of the entity.

6. The computer-implemented method of claim 1, further comprising:
   generating, by the computing system, a leaderboard to highlight engagement activity by users determined to be top fans of the entity, the leaderboard including engagement activity by the user who is determined to be a top fan of the entity.

7. The computer-implemented method of claim 1, wherein determining an engagement score for a user further comprises:
   determining, by the computing system, at least a first engagement sub-score based on engagement by the user with respect to a first content item associated with the entity;
   determining, by the computing system, at least a second engagement sub-score based on engagement by the user with respect to a second content item associated with the entity; and
   determining, by the computing system, the engagement score for the user based at least in part on the first and second engagement sub-scores.

8. The computer-implemented method of claim 7, wherein the determining at least a first engagement sub-score further comprises:
   determining, by the computing system, types of engagement by the user with respect to the first content item associated with the entity;
   determining, by the computing system, respective weights for the types of engagement by the user; and
   determining, by the computing system, the first engagement sub-score based at least in part on the types of engagement by the user and the respective weights determined for the types of engagement.

9. The computer-implemented method of claim 8, wherein the types of engagement by the user include one or more of an indication of whether the user selected a like reaction in response to the content item associated with the entity, an indication of whether the user selected a love reaction in response to the content item associated with the entity, an indication of whether the user selected a funny reaction in response to the content item associated with the entity, an indication of whether the user selected a shock reaction in response to the content item associated with the entity, an indication of whether the user selected a sad reaction in response to the content item associated with the entity, an indication of whether the user selected an angry reaction in response to the content item associated with the entity, a count of high quality comments submitted by the user in response to the content item associated with the entity, a count of low quality comments submitted by the user in response to the content item associated with the entity, a count of instances the user shared the content item associated with the entity, an indication of whether the user selected a respond option associated with the content item of the entity, and an indication of whether the user selected a dislike reaction in response to the content item associated with the entity.

10. The computer-implemented method of claim 8, wherein the respective weights for the types of engagement are learned based at least in part on a machine learning regression model that relates user responses to content satisfaction surveys and user engagement with content items associated with the content satisfaction surveys.

11. The method of claim 1, wherein the machine learning model is trained further based on features including at least one of sentiment determined for a comment, text attributes of a comment, user engagement of an author of a comment.

12. The method of claim 1, wherein the likelihood is determined based on a second machine learning model trained on user feature data.

13. A system comprising:
at least one processor; and
a memory storing instructions that, when executed by the at least one processor, cause the system to perform:
determining respective engagement scores for one or more users based at least in part on their engagement with a plurality of content items associated with an entity in a content provider system, wherein the engagement includes a type of engagement associated with high quality comments determined by a machine learning model that is trained based at least in part on user responses to comment quality surveys;
determining a user who is a top fan of the entity based at least in part on the engagement scores;
providing a notification to the user based on a likelihood that the user will accept recognition as a top fan; and
based on acceptance of the recognition, associating the user with a visual badge in the content provider system to identify the user as a top fan of the entity, wherein the visual badge is made visible by the content provider system to at least the entity.

14. The system of claim 13, wherein the instructions further cause the system to perform:
determining at least one comment posted by the user in response to a content item associated with the entity; and
ranking the at least one comment higher than a comment posted by a different user based at least in part on the user being a top fan of the entity and the different user not being a top fan of the entity.

15. The system of claim 14, wherein the instructions further cause the system to perform:
determining that the at least one comment posted by the user satisfies a high quality comment metric.

16. The system of claim 13, wherein the instructions further cause the system to perform:
distributing additional content associated with the entity to the user who is determined to be a top fan of the entity, wherein the additional content is different from content distributed to other users who are not top fans of the entity.

17. The system of claim 13, wherein the instructions further cause the system to perform:
enrolling the user who is determined to be a top fan of the entity as a member of a group in the content provider system, wherein membership in the group is restricted to users determined to be top fans of the entity.

18. A non-transitory computer-readable storage medium including instructions that, when executed by at least one processor of a computing system, cause the computing system to perform a method comprising:
determining respective engagement scores for one or more users based at least in part on their engagement with a plurality of content items associated with an entity in a content provider system, wherein the engagement includes a type of engagement associated with high quality comments determined by a machine learning model that is trained based at least in part on user responses to comment quality surveys;
determining a user who is a top fan of the entity based at least in part on the engagement scores;
providing a notification to the user based on a likelihood that the user will accept recognition as a top fan; and
based on acceptance of the recognition, associating the user with a visual badge in the content provider system to identify the user as a top fan of the entity, wherein the visual badge is made visible by the content provider system to at least the entity.

19. The non-transitory computer-readable storage medium of claim 18, wherein the instructions further cause the computing system to perform:
determining at least one comment posted by the user in response to a content item associated with the entity; and
ranking the at least one comment higher than a comment posted by a different user based at least in part on the user being a top fan of the entity and the different user not being a top fan of the entity.

20. The non-transitory computer-readable storage medium of claim 19, wherein the instructions further cause the computing system to perform:
determining that the at least one comment posted by the user satisfies a high quality comment metric.

* * * * *